United States Patent

Raifman

[11] Patent Number: 5,112,503
[45] Date of Patent: May 12, 1992

[54] MODULAR FILTER ASSEMBLY

[75] Inventor: Stuart M. Raifman, Sharon, Mass.

[73] Assignee: Systems Engineering and Manufacturing Corp., Stoughton, Mass.

[21] Appl. No.: 507,045

[22] Filed: Apr. 9, 1990

[51] Int. Cl.$^5$ .............................................. B01D 25/02
[52] U.S. Cl. ............................... 210/777; 210/232; 210/346; 210/486; 210/488; 55/495; 55/504; 55/DIG. 5
[58] Field of Search ............... 210/193, 232, 346, 486, 210/488, 498, 777; 55/495, 499, DIG. 5, 502, 504

[56] References Cited

U.S. PATENT DOCUMENTS

| | | |
|---|---|---|
| 884,253 | 4/1908 | Youngman . |
| 1,903,368 | 4/1933 | Symons et al. . |
| 2,143,270 | 1/1939 | Huber .................................. 210/178 |
| 2,313,307 | 3/1943 | Wilkinson . |
| 3,334,750 | 8/1967 | Ullman, Jr. ......................... 210/486 |
| 3,361,261 | 1/1968 | Fairey et al. ........................ 210/314 |
| 3,648,841 | 3/1972 | Schotten et al. ..................... 210/224 |
| 3,888,769 | 6/1975 | Schotten et al. ..................... 210/227 |
| 4,053,416 | 10/1977 | Howard et al. ..................... 210/227 |
| 4,132,649 | 1/1979 | Croopnick et al. .................. 210/488 |
| 4,224,864 | 9/1980 | Wendell ................................ 99/349 |
| 4,267,045 | 5/1981 | Hoof .................................... 210/322 |
| 4,783,262 | 11/1988 | Ostreicher et al. .................. 210/314 |
| 4,894,155 | 1/1990 | Leoncavallo et al. ............... 210/486 |

*Primary Examiner*—Robert A. Dawson
*Assistant Examiner*—Wanda L. Millard
*Attorney, Agent, or Firm*—Wolf, Greenfield & Sacks

[57] ABSTRACT

A modular filter assembly is described comprising a filter stack having a plurality of filter sheets and a plurality of filter support plates each having a perimeter and an internal filter flow passageway portion. The filter sheets are sandwiched between surrounding filter support plates forming the stack and the filter flow passageway portions of the plates and filter sheets are aligned to form a filter flow passageway extending from the top to the bottom of the stack. The filter stack has engaging means capable of keeping the filter support plates together while minimized top to bottom dimension because it is not necessary to use external clamps for keeping the support plates together. Also described are support plates for modular filters and a method for forming a modular filter assembly.

23 Claims, 4 Drawing Sheets

MODULAR FILTER ASSEMBLY

FIELD OF THE INVENTION

The present invention relates to a modular filter assembly. The modular filter assembly of the present invention can be used to treat fluids as in water purification.

BACKGROUND

Modular filter assemblies can be used to purify fluids for both home and industrial applications. Home applications include water purification while industrial applications include purification of electroplating solutions.

A presently available means for purifying water in the home includes a depth wound cartridge filter which is placed in a housing incorporated within the plumbing of a home. Multi-compartmental or modular filter cartridges typically are not used for home applications because they are not designed to be interchangeable with the wound depth filter cartridge. Multi-compartmental filters typically require external clamps for holding the multiple filter plates together. The use of external clamps increases the axial dimension of the filter assembly, preventing the possibility of placement of the multi-compartmental assembly filter in the housings used for the wound depth cartridge filters (i.e., the filter assembly and external clamps have an axial dimension which will not fit into the housing).

SUMMARY OF THE INVENTION

This invention pertains to a modular filter assembly capable of being used in housings typically used for wound depth cartridge filters. The modular filter assembly comprises a filter stack having a plurality of filter sheets and a plurality of filter support plates each having a perimeter and an internal filter flow passageway portion. The filter sheets are sandwiched between surrounding filter support plates forming the stack and the filter flow passageway portions of the plates and filter sheets are aligned to form a filter flow passageway extending through the filter sheets and the support plates. The filter stack has a minimized top to bottom dimension because it is not necessary to use external clamps for keeping the support plates together.

The support plates have a fluid exposure chamber on one side and a fluid collection chamber on another side. The support plates further define outer fluid flow slots on the periphery of each plate on a first side and inner fluid flow slots on a second side of each plate. The filter stack further comprises engaging means for aligning the plates with the filter sheets sandwiched between successive plates and for applying a clamping force at the periphery of each plate to seal each filter between each pair of plates.

This invention further pertains to a method of forming a filter stack for filtering fluids. The method utilizes a plurality of substantially identical filter support plates each having an upstanding ferrule and an axially aligned downwardly extending boss. The boss and ferrule have mating mounting means whereby a plurality of plates can be joined together to apply an aligning and clamping action to filters spaced between adjacent filter support plates. The assembly is formed by positioning a filter sheet between the pairs of adjacent plates and engaging the mating engaging means to lock the plates together.

This invention also pertains to a filter support plate for use in a modular filter assembly comprising a fluid exposure chamber on one side thereof and a fluid collection chamber on a second side thereof. The support plate further comprises engaging means for aligning the plate with at least one other plate on each side thereof while having filters sandwiched between successive plates. The engaging means is capable of holding at least two support plates together while applying a clamping force at the periphery of each plate to seal the filter between pairs of plates.

This invention further pertains to a method for purifying a fluid by contacting the fluid with a modular filter assembly. The modular filter assembly has outer fluid flow slots, filter support plates, filter sheets, fluid collection chambers, fluid exposure chambers, and inner fluid flow slots. The fluid flows through outer slots defined by the filter support plates, through a fluid exposure chamber, through a filter sheet sandwiched between a plurality of filter support plates, into a fluid collection chamber, out inner fluid flow slots and into an internal fluid flow passageway. The fluid can be a liquid or a gas and preferably is water.

It is an object of this invention to provide a modular filter assembly having a minimized top to bottom dimension in an efficient, easily assembled stack arrangement.

It is another object of this invention to provide a multi part, adjustable length, modular filter assembly which can be used in place of conventional wound depth filter cartridge.

It is another object of this invention to provide a modular filter assembly having increased surface area available for treating the fluid.

It is yet another object of this invention to provide a modular filter for use in efficient, economical home water purification applications.

DETAILED DESCRIPTION

Figure 1:
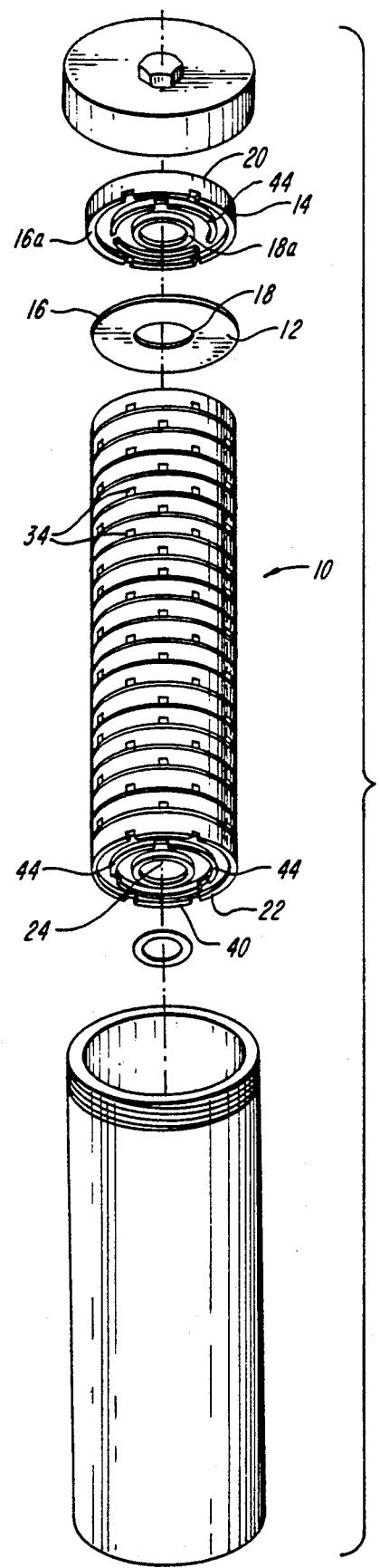
FIG. 1 is an exploded view of the modular filter assembly including the outer casing.

As shown in FIG. 1, the present invention pertains to a modular filter assembly comprising a filter stack 10 having a plurality of filter sheets 12 and a plurality of identical filter support plates 14. Each sheet 12 and plate 14 has a perimeter 16, 16a and an internal filter flow passageway portion 18, 18a. The filter stack 10 has a top 20 and a bottom 22 and an internal filter flow passageway 24 extends from the top 20 to the bottom 22 of the stack. The filter sheets 12 are sandwiched between surrounding plates 14 to form the stack 10 with said filter flow passageway portions 18 being axially aligned to form a filter flow passageway 24 extending through the filter sheets 12 and the support plates 14 from the top 20 to the bottom 22 of the stack 10. The stack 10 has a minimized top 20 to bottom 22 axial dimension.

As shown in FIGS. 2-5, the circular support plates 14 have a fluid exposure chamber 26 on one side 28 and a fluid collection chamber 30 on another side 32. The support plates 14 further define six identical outer fluid flow slots 34 on the periphery 16a of each plate on a first side 28 and inner flow fluid flow slots 38 on a second side 32 of each plate 14. The filter support plates 14 also have engaging means 40 for aligning the plates 14 with the filter sheets 12 sandwiched between successive plates 14 and for applying a clamping force at the periphery 16a of each plate to seal each filter sheet 12 between each pair of plates 14. Each plate 14 may also define means for clamping an inner portion 42 of each filter sheet 12 adjacent to it when the stack 10 is assembled. The means for clamping an inner portion 42 allows fluid to flow through the outer slots 34, pass to the fluid exposure chamber 26, then through a sandwiched filter 12 and into a fluid collection chamber 30 and out of the inner fluid flow slots 3 into said fluid flow passageway 24.

The filter stack 10 has a minimized top 20 to bottom 22 axial dimension. The filter stack 10 is designed such that an external clamp is not needed to hold the support plates 14 together and therefore the filter stack 10 is interchangeable with the conventional wound depth filter cartridges used for home water purification. The filter stack 10 can be used in the same housings as the conventional wound depth filter cartridges and preferably has a height from about 5 to about 30 inches and a diameter from about 2½ to about 3½ inches.

The filter sheets 12 are made of material capable of being formed into sheets and retaining dimensional and structural integrity. Examples of such materials include paper, polypropylene, cellulose, polytetrafluoroethylene, tetrafluoroethylene, and other synthetic materials. The porosity and/or thickness of the filter sheet is selected depending on the materials desired to be removed from the fluid. Examples of useful porosities include from about 0.5 to about 50 microns. Examples of useful thicknesses are from about 1 mm to about ⅛th of inch. The filter sheet 12 is sandwiched between two filter support plates 14 and has an opening or an internal filter flow passageway portion 18, which allows fluid to flow through the filter flow passageway 24 of the stack.

The filter sheet 12 can optionally be precoated with a porous material. When the filter 12 is precoated with the porous material, the porosity of the filter should be of a size capable of retaining the precoat, e.g. from about 10 to about 25 microns. The porous material used as a precoat is selected such that it is inert to the fluid being treated. An advantage of using a precoat on a filter 12, such as diatomaceous earth, is that there is more available surface area for treating the fluid because the diatoms group on top of each other in a non-planar manner.

The filter support plates 14 are made of a material which is inert and capable of maintaining structural and dimensional integrity. Preferred materials used to make the support plates 14 are polymeric materials. The term polymeric compound is intended to encompass both inorganic polymers, organic polymers and resins. Inorganic polymers can include glass or glass like materials. Organic polymers and resins can include plastic. The plastics can be thermoplastic or thermosetting plastics. The preferred plastics of the present invention are thermosetting plastics. Examples of such materials include polypropylene, polyethylene, polyvinyldifluoride, polyvinylchlorides, acrylics, polymethylmethacrylate, polycarbonate, and Kynar, a polyvinyldifluoride product of B. F. Goodrich. The support plates 14 can be prepared using conventional techniques such as injection molding, machining, or the like.

Figure 4:
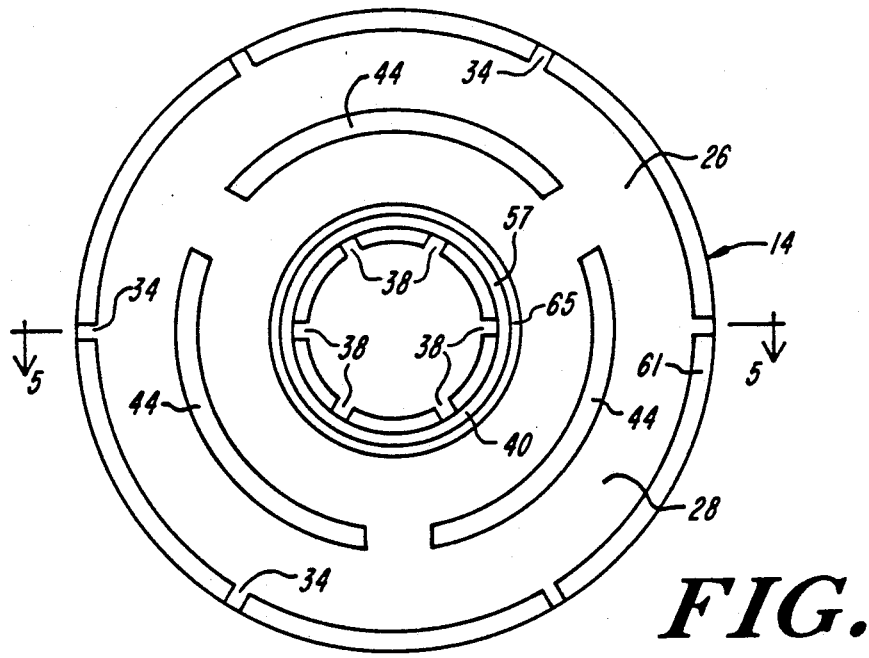
FIG. 4 is a bottom view of a filter support plate showing a fluid exposure chamber.
Figure 5:
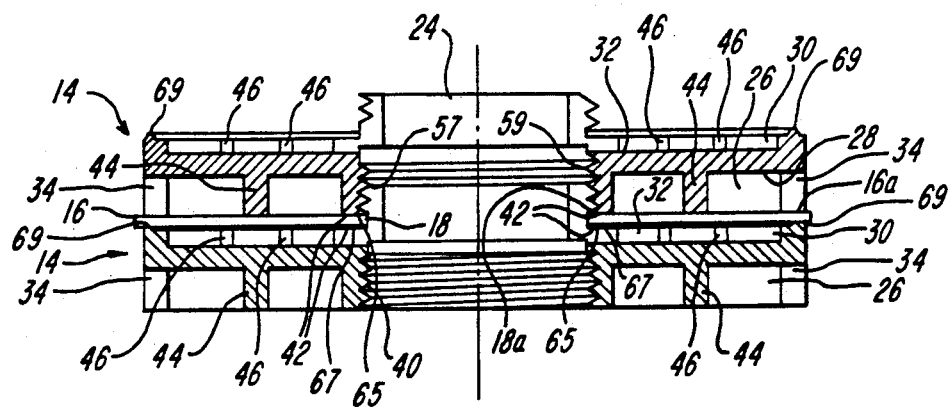
FIG. 5 is a cross-sectional view along the line 5—5 of FIG. 4 showing two filter support plates having a filter interspersed therebetween wherein the plates are held together by a threaded ferrule and boss.

The filter support plate 14 has a fluid exposure chamber 26 on one side 28 for exposing the fluid to be treated to the filter sheet 12 and a fluid collection chamber 30 on another side 32. The fluid exposure chamber 26 may have support members 44 for maintaining the filter sheet 12 in a planar position. The support members 44 can be arranged in any manner suitable for holding the filter sheet 12 in a planar position. The support members 44 are preferably arranged in at least one discontinuous circle concentric with the fluid flow passageway 24 as shown in FIG. 4. The support members 44 can be arranged or shaped in any manner suitable for holding the filter sheet 12 preferably in a planar position.

Figure 2:
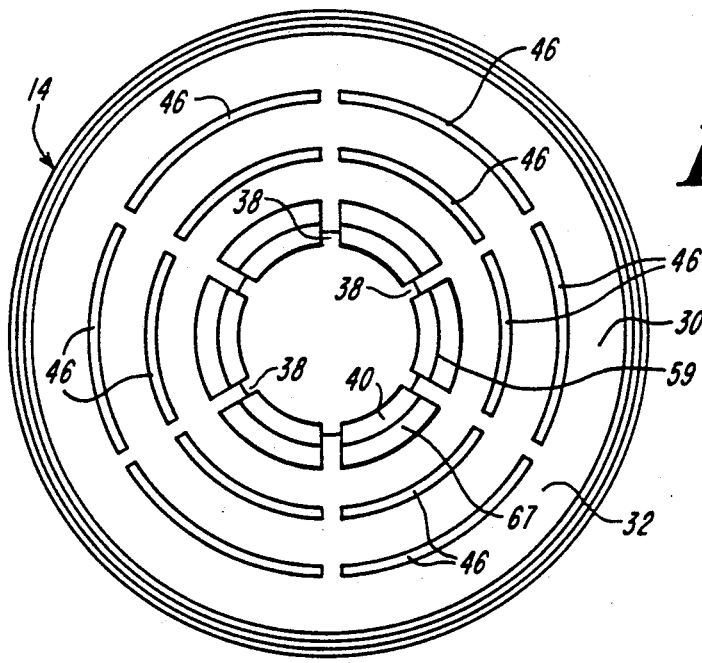
FIG. 2 is a top view of a filter support plate showing a fluid collection chamber.
Figure 3:
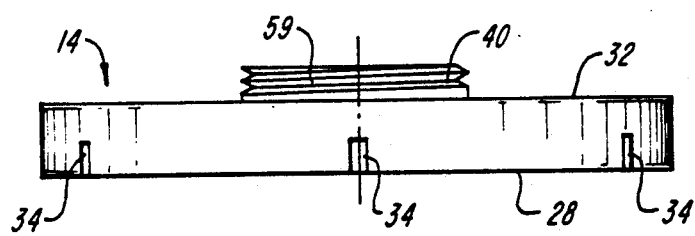
FIG. 3 is a side view of a filter support plate.

The fluid collection chamber 30 may optionally have guiding members 46 which help guide the fluid through openings 55 to the inner fluid flow slots 38 as shown in FIG. 2. The support plates 14 have outer fluid flow slots 34 on the periphery 36 of the first side 28 and inner fluid flow slots 38 on a second side 32 of each plate 14. The fluid being treated flows through the outer slots 34, passes through the fluid exposure chamber 26 and through the sandwiched filter sheet 12, and into the fluid collection chamber 30. Upon entering the fluid collection chamber 30, the guiding members 46 help guide the fluid being treated to the inner fluid flow slots 38 on the second side 32 of the support plate 14. The guiding members 46 can be arranged or shaped in any manner suitable for guiding the fluid to the inner fluid flow slots 38. The guiding members 46 are preferably arranged as discontinuous circles having openings 55 aligned with the inner fluid flow slots 38 as shown in FIG. 2.

The inner 38 and outer 34 slots can be any opening capable of allowing fluid to flow therethrough. The slots 34, 38 can be circularly or rectangularly shaped, for example. The outer fluid flow slots 34 are preferably located on the periphery 36 of the support plate 14 on one side 28 and the inner fluid flow slots 38 are preferably located in an area surrounding the internal filter flow passageway 24 of the filter stack 10. The number of slots 34, 38 varies and is selected based upon such factors as the amount of fluid being treated. Fewer slots 34, 38 can be used at lower flow rates of fluid to be treated. Each filter support plate 14 may have six internal inner fluid flow slots 38 and six outer fluid flow slots 34 for average household flow rates for purifying water as shown in the figures.

The filter stack 10 further has an engaging means 40 for aligning the plates 14 with the filter sheets 12 sandwiched between them and for applying a clamping force at the periphery 36 of each plate 14. The clamping force seals the filter sheets 12 between each pair of plates so that the fluid being treated does not leak out of the edges of the support plates 14.

The engaging means 40 is a means capable of applying a force around the periphery 16a of each plate 14 while holding at least two support plates 14 together. Examples of such engaging means 40 include threaded bosses 57 and ferrules 59, two cammed surfaces capable of interlocking with each other, or any attachment means capable of being twisted together in a fashion which would apply an axial force around the periphery 16a.

The engaging means 40 preferably includes a first flange 61 extending around the periphery 16a of each support plate 14 capable of pressing against a first flat surface 69 extending around the periphery 16a of an adjacent support plate 14. This pressing force prevents fluid from flowing out of the periphery 16a of the filter assembly. This pressing action also allows filters 12 varying in thicknesses to be used within the same filter assembly. The language "extending around the periphery" 16a is intended to encompass on the edge or near the edge of the support plate 14. The first flange 61 does not have to be directly on the edge of the support plate 14 and can be near the edge. The preferred first flange 61 is a raised lip extending around the edge of the support plate 14, thereby allowing the maximum available surface area of the filter sheet 12 for filtering purposes.

The filter stack 10 can also have a means for clamping the inner portion 42 of each filter sheet 12. This means 42 comprises a second flange 65 which presses against a second continuous flat surface 67 of the adjacent plate 14 which holds the filter sheet 12 in place within the filter stack 10 by applying a clamping force around the portion of the filter 12. The second flange 65 and second flat surface 67 extend around the internal filter flow passageways 24 of each adjacent plate 14 and seals this edge of the filter against fluid flow other than across the filter from each chamber 30 to each chamber 26. The means for clamping the inner portion 42 of the filter sheet 12 can be the same or different than the engaging means 40 or can be a component of the engaging means 40. The preferred means 42 for clamping the inner portion is a raised lip extending around the internal filter flow passageway 24. The language extending around the internal filter flow passageway 24 is intended to encompass directly around the circumference of the internal filter flow passageway 24 or near the circumference of the internal flow passageway 24. This raised lip or flange 61 is capable of interlocking with an edge or first flat surface 69 from the next sequential support plate 14.

The preferred embodiment of the present invention is a modular filter assembly having support plates 14 with engaging means 40 comprising a threaded boss 57 on one side 28 of the plate 14 and a threaded ferrule 59 on another side 32 of the support plate 14. For example, a male threaded ferrule 59 of one plate 14 can be received by a female threaded boss 57 of a support plate 14 adjacent the one side 28 and a female threaded boss 57 of the support plate 14 receives a male threaded ferrule 59 of the support plate 14 adjacent the other side 32 thereby causing a sandwiching and clamping effect on the filter sheet 12. One of ordinary skill in the art would know that the threading of the ferrules 59 and bosses 57 can also be female and male, respectively.

Figure 6:
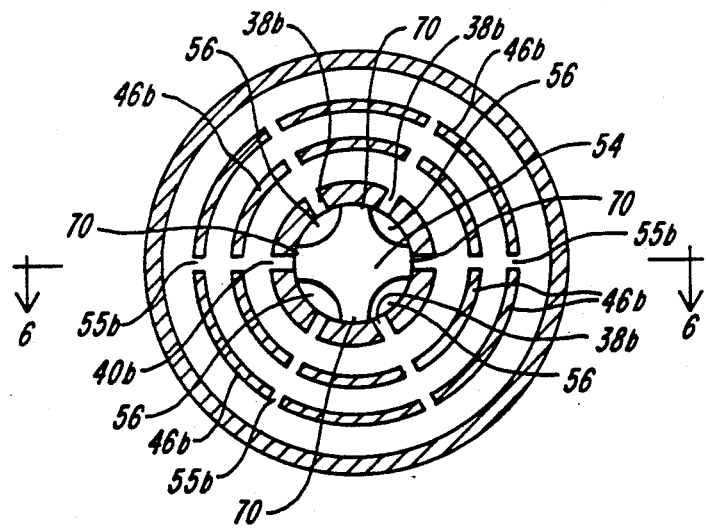
FIG. 6 is a top view of a filter assembly wherein a rod having four arcuate portions is holding the filter support plates together forming a filter stack.
Figure 7:
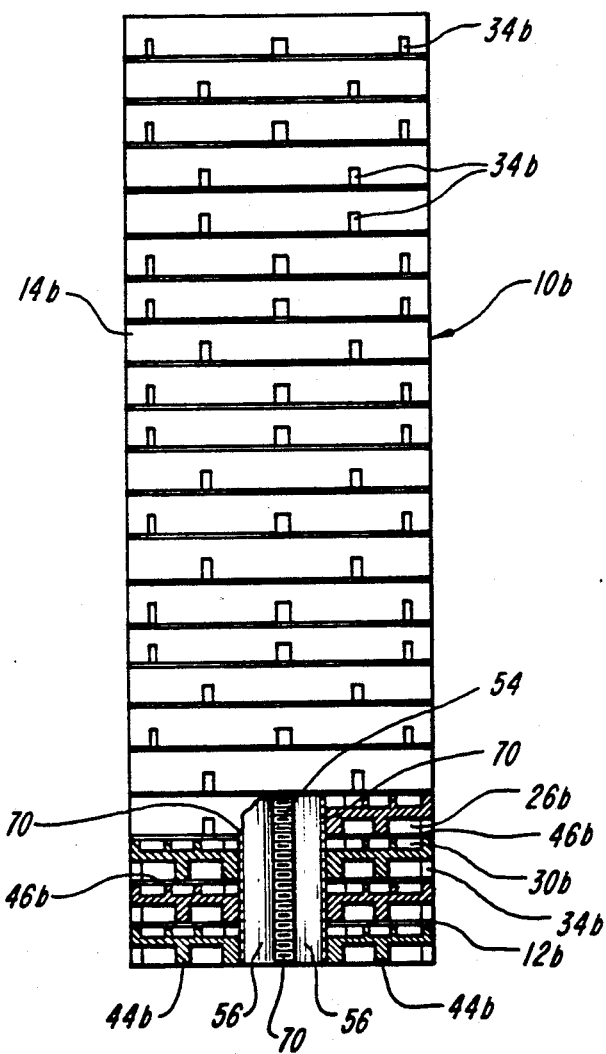
FIG. 7 is a cross sectional view along the 6—6 line of FIG. 6 showing two filter support plates having a filter interspersed therebetween wherein a rod holds the filter support plates together forming a filter stack.

FIG. 6 and 7 depict a second embodiment for the modular filter assembly, wherein the support plates 14b are held together by mating an internally threaded portion 52 of each support plate 14 with a through externally threaded rod 54. Elements of FIG. 6 and 7 which are the same as those previously described in FIGS. 1-5 will be given the same numbers followed by a "b". The rod 54 has externally threaded portions 70 defining four arcuate top to bottom passages 56 forming the internal fluid flow passageway 24. The rod or tube 54 can be hollow or solid and is positioned within the internal fluid low passageway 24 in a manner providing access from the fluid collection chambers 30 to the internal filter flow passageway 24. The rod can have internal passageways or can be scalloped as shown in FIG. 7. The rod 54 further is capable of holding the support plates 14 together. As shown in FIG. 7, the fluid being treated flows into the outer fluid flow slots 34b, then passes into the fluid exposure chamber 26b, through the filter sheet 12b, and into the fluid collection chamber 34b. The fluid collection chamber 30b has guiding members 40b for guiding the fluid to the inner fluid flow slots 38b. At least some of the inner fluid flow slots 38b are aligned such that the fluid flows into the four arcuate top to bottom passages 56 forming the internal fluid flow passageway 24.

The invention will be further illustrated by the following example, which is not intended to be limiting in any way.

EXAMPLE 1

Use of the Cartridge Filter Assembly of the Present Invention for Purifying Water in the Home A plastic housing capable of holding the modular assembly is inserted into the plumbing of the home, such that water flows into the housing through a pipe on the bottom, surrounds the modular filter assembly and is purified by flowing through the filter assembly. The purified water leaves the housing through a pipe interconnected and preferably aligned with the internal fluid flow passageway of the assembly. The cartridge type filter assembly has an overall length of approximately 10 inches consisting of 22 filter support plates and 21 filters. Ten micron, one sixteenth of an inch thick, donut shaped polypropylene filters are used as filter sheets within the cartridge filter assembly and 3⅛" circular polypropylene support plates are used. The modular assembly is used to purify the water at a home flow rate of approximately 1 to 5 gallons per minute at a pressure of about 40 psi.

While specific embodiments of the invention have been shown and described, many variations are possible. For example, the materials used for the various components can vary greatly. The support plates are preferably made of a thermoplastic organic polymeric material but other materials such as other thermoplastics, thermosetting resins, metals and the like can be used. While the plates are preferably round with the internal fluid flow passageway about a central axis, the plates can have other shapes if desired. Preferably, the internal fluid flow passageway is centrally located although this is not required. The threaded interconnection between the plates can be a continuous thread as shown although cam surfaces or other interconnecting means which permit a clamping and interengaging action can be used.

The housing 72 surrounding the modular filter assembly can be any housing that encloses the cartridge assembly. In most cases, such housing would be designed for use in attachment to an inlet for water or other fluids to be filtered. Thus, the water will flow about the assembly and into the outer slots.

In all cases, it is preferred to keep the overall axial length of the modular filter assembly minimized as compared with prior art clamping arrangements wherein clamps extend over the outermost plate on filters stacks adding to the axial distance of the unit. Note that the unit axial length substantially ends with the bottom plate and top plate. In some cases the raised lip around the periphery of the to plate need not be present and can be removed.

I claim:

1. A modular filter assembly comprising a filter stack having a plurality of filter sheets and a plurality of filter support plates each having a perimeter and an internal filter flow passageway portion, with said stack having a top and a bottom, each of said sheets being sandwiched between surrounding plates to form said stack with said filter flow passageway portions being aligned to form a filter flow passageway extending through said filter sheets and said support plates from top to bottom and said stack having a minimized top to bottom dimension, said support plates comprising a fluid exposure chamber on one side thereof and a fluid collection chamber on another side thereof, and further defining outer fluid flow slots on said periphery of each plate on a first side of each plate and inner fluid flow slots on a second side of each plate; and an integral mating engaging means for aligning said plates with said filters sandwiched between successive plates and for applying a clamping force at the periphery of each plate by means of said integral mating means to seal each filter between each pair of plates and maintain said stack position.

2. A modular filter assembly in accordance with claim 1 and further comprising each of said plates defining means for clamping an inner portion of each filter sheet adjacent to it when said stack is assembled, whereby fluid flows through said outer slots passes through said fluid exposure chamber, and a sandwiched filter, into a fluid collection chamber and out of said inner slots into said fluid flow passageway.

3. A modular filter assembly as claimed in claim 1 wherein the engaging means includes a flange extending around the periphery of each support plate.

4. A modular filter assembly as claimed in claim 2 wherein the mean for clamping the inner portion of each filter sheet is a flange extending around the internal filter flow passageway.

5. A modular filter assembly as claimed in claim 1 or 4 wherein the assembly is capable of accommodating filter sheets of different thicknesses.

6. A modular filter assembly comprising a filter stack having a plurality of filter sheets and a plurality of filter support plates each having a perimeter and an internal filter flow passageway portion, with said stack having a top and a bottom, each of said sheets being sandwiched between surrounding plates to form said stack with said filter flow passageway portions being aligned to form a filter flow passageway extending through said filter sheets and said support plates from top to bottom and said stack having a minimized top to bottom dimension, said support plates comprising a fluid exposure chamber on one side thereof and a fluid collection chamber on another side thereof, and further defining outer fluid flow slots on said periphery of each plate on a first side of each plate and inner fluid flow slots on a second side of each plate; and an integral mating means for aligning said plates with said filters sandwiched between successive plates and for applying a clamping force at the periphery of each plate by means of said integral mating means to seal each filter between each pair of plates and maintain said stack in position, said engaging means comprising each of said support plates having a threaded ferrule on one side and threaded boss on another side, whereby the threaded ferrule is received by the threaded boss of the support plate adjacent the one side and the threaded boss receives the threaded ferrule of the support plate adjacent the other side, thereby causing a sandwiching and clamping effect on the filter.

7. A modular filter assembly comprising a filter stack having a plurality of filter sheets and a plurality of filter support plates each having a perimeter and an internal filter flow passageway portion, with said stack having a top and a bottom, each of said sheets being sandwiched between surrounding plates to form said stack with said filter flow passageway portions being aligned to form a filter flow passageway extending through said filter sheets and said support plates from top to bottom and said stack having a minimized top to bottom dimension, said support plates comprising a fluid exposure chamber on one side thereof and a fluid collection chamber on another side thereof, and further defining outer fluid flow slots on said periphery of each plate on a first side of each plate and inner fluid flow slots on a second side of each plate; and an integral mating means for aligning said plates with said filters sandwiched between successive plates and for means of said integral mating means to seal each filter between each pair of plates and maintain said stack in position, said engaging means comprising the internal filter flow passageway being formed by an internally threaded portion of each support plate mating with a through externally threaded rod, said rod having internal passageways to allow access from the fluid collection chambers to the internal filter flow passageway.

8. A modular filter assembly as claimed in claim 1 wherein each support plate has support members in the fluid exposure chamber for maintaining the filter sheet in a planar position.

9. A modular filter assembly as claimed in claim 8 wherein the support members are arranged in at least one discontinuous circle concentric with the fluid flow passageway.

10. A modular filter assembly as claimed in claim 1 wherein each support plate has guiding members in the fluid collection chamber for guiding the fluid to the inner fluid flow slots.

11. A modular filter assembly as claimed in claim 10 wherein the guiding members are arranged in at least one discontinuous circle concentric with the fluid flow passageway wherein openings in the discontinuous circle are aligned with the inner fluid flow slots.

12. A modular filter assembly as claimed in claim 6 wherein the inner fluid flow slots prevent over tightening of the support plates thereby preventing stripping of the threaded ferrules and bosses.

13. A modular filter assembly as claimed in claim 1 wherein the filter is made of a material selected from the group consisting of paper, polypropylene, cellulose, polytetrafluoroethylene and tetrafluoroethylene.

14. A modular filter assembly as claimed in claim 1 or 13 wherein the filter is coated with a porous material.

15. A modular filter assembly as claimed in claim 14 wherein the porous material is a diatomaceous earth.

16. A modular filter assembly as claimed in claim 1 wherein the filter support plates are made of polymeric material.

17. A modular filter assembly as claimed in claim 16 wherein the polymeric material is selected from the group consisting of polypropylene, polyethylene, polyvinyldifluoride, polyvinylchloride, acrylics, polycarbonates, and Kynar.

18. A modular filter assembly as claimed in claim 1 wherein the filter stack has a height from about 5 to about 30 inches.

19. A modular filter assembly as claimed in claim 1 wherein the support plates have a diameter between about 2½ to about 3½ inches.

20. A method of forming a filter stack for filtering fluids, said method comprising,
utilizing a plurality of substantially identical filter support plates, each having an upstanding ferrule and an axially aligned downward extending boss, said boss and ferrule having integral mating mounting and clamping means whereby a said plurality of plates may be mated and joined together to apply an aligning and clamping action to filters spaced between adjacent filter plates, and
forming an assembly by positioning a filter sheet between pairs of adjacent plates and engaging said integral mating engaging means to lock said plates together in a desired alignment in said stack.

21. A method as claimed in claim 20 wherein said filter plates are substantially circular and have portions adapted to clamp said filters therebetween and further define a central fluid flow passageway.

22. A filter support plate for use in a modular filter assembly comprising,
a fluid exposure chamber on one side thereof and a fluid collection chamber on a second side thereof; and
mating engaging and compressing means integral with said plate for aligning said plate with a mating means of at least one other plate on each side thereof while having filters sandwiched between successive plates,
wherein said engaging means is capable of applying a clamping force at the periphery of each plate to seal the filter between pairs of plates while holding successive support plates together in a desired position.

23. A filter support plate as claimed in claim 22 wherein the engaging means comprises a boss and ferrule having mating mounting means whereby a plurality of plates may be joined together to apply an aligning and clamping action to filters spaced between adjacent filter plates.

* * * * *